United States Patent
Dandy et al.

(10) Patent No.: US 10,915,519 B2
(45) Date of Patent: Feb. 9, 2021

(54) PROCESSING OFFLINE UPDATES TO RECORDS OF A DATABASE SYSTEM

(71) Applicant: salesforce.com, inc., San Francisco, CA (US)

(72) Inventors: Michael Dandy, San Francisco, CA (US); Aleksandra Zhulina, Woodland Hills, CA (US); Abraham Adam, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 841 days.

(21) Appl. No.: 15/261,606

(22) Filed: Sep. 9, 2016

(65) Prior Publication Data

US 2018/0075078 A1     Mar. 15, 2018

(51) Int. Cl.
*G06F 16/00* (2019.01)
*G06F 16/23* (2019.01)

(52) U.S. Cl.
CPC ...... *G06F 16/2322* (2019.01); *G06F 16/2358* (2019.01); *G06F 16/2372* (2019.01)

(58) Field of Classification Search
CPC ............. G06F 16/2322; G06F 16/2372; G06F 16/2358
USPC ....................................................... 707/691
See application file for complete search history.

(56) References Cited

U.S. PATENT DOCUMENTS

| | | |
|---|---|---|
| 5,333,316 A * | 7/1994 | Champagne ............ G06F 17/50 707/E17.007 |
| 5,577,188 A | 11/1996 | Zhu |
| 5,608,872 A | 3/1997 | Schwartz et al. |
| 5,649,104 A | 7/1997 | Carleton et al. |
| 5,692,184 A * | 11/1997 | Ardoin ................. G06F 16/289 700/182 |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Shiow-Jy Fan
(74) *Attorney, Agent, or Firm* — Weaver Austin Villeneuve & Samosen LLP

(57) ABSTRACT

Disclosed are examples of systems, apparatus, methods, and computer program products for processing offline updates to records of a database system. In some implementations, a first update to a record is processed, and the record is modified according to a first action and first data of the first update. A second update to the record from a device with an offline status is processed. It can be determined that the second update and the first update are associated with a same portion of the record. It can be determined that the second timestamp is prior to the first timestamp. A notification can be provided to the device. The record can be modified according to a second action and second data of the second update.

20 Claims, 9 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,578,054 B1 * | 6/2003 | Hopmann | G06Q 10/107 707/625 |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 * | 6/2006 | Desai | G06F 16/958 715/205 |
| 7,100,111 B2 | 8/2006 | McElfresh et al. | |
| 7,181,758 B1 | 2/2007 | Chan | |
| 7,259,666 B1 * | 8/2007 | Hermsmeyer | G06F 11/0709 340/517 |
| 7,269,590 B2 | 9/2007 | Hull et al. | |
| 7,289,976 B2 | 10/2007 | Kihneman et al. | |
| 7,301,448 B1 * | 11/2007 | Usery | H04L 41/0613 340/506 |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,836,501 B2 * | 12/2017 | Robichaud | G06F 16/00 |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0005273 A1 * | 1/2003 | Perycz | H04L 41/0856 713/1 |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0068516 A1 * | 4/2004 | Lee | G06F 16/182 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |

(56) References Cited

U.S. PATENT DOCUMENTS

| | | |
|---|---|---|
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050068 A1* | 3/2005 | Vaschillo ............... G06F 16/258 |
| 2005/0050555 A1 | 3/2005 | Exley et al. |
| 2005/0091098 A1 | 4/2005 | Brodersen et al. |
| 2005/0166179 A1* | 7/2005 | Vronay ................. G06Q 10/00 717/105 |
| 2007/0078950 A1* | 4/2007 | Hopkins ............... H04L 41/145 709/217 |
| 2007/0130514 A1* | 6/2007 | Matthee ................ G06F 40/186 715/210 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0328023 A1* | 12/2009 | Bestland ................... G06F 8/65 717/168 |
| 2010/0005012 A1* | 1/2010 | Wahlberg ............... G06Q 30/04 705/30 |
| 2010/0042613 A1* | 2/2010 | Malden ................. G06Q 30/02 707/707 |
| 2010/0174679 A1* | 7/2010 | Baynes, Jr. ............. H04L 29/06 707/617 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0239886 A1* | 9/2012 | Rantanen ............... G06F 16/273 711/147 |
| 2012/0290407 A1 | 11/2012 | Hubbard et al. |
| 2013/0031172 A1* | 1/2013 | Olsen ...................... H04L 51/28 709/204 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0122161 A1* | 5/2014 | Gupta ............. G06Q 10/06316 705/7.26 |
| 2014/0304476 A1* | 10/2014 | Bachar ................ G06F 12/0871 711/133 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2015/0309701 A1* | 10/2015 | Jatzold ................ G06F 16/2322 715/765 |
| 2015/0379062 A1* | 12/2015 | Vermeulen .......... G06F 16/2365 707/691 |
| 2016/0125169 A1* | 5/2016 | Finn ........................ G06F 16/93 707/692 |
| 2017/0177690 A1* | 6/2017 | Ritter ................. G06F 16/2358 |

* cited by examiner

| | Draft Record | Master Record | Server Record | Conflict | Merge |
|---|---|---|---|---|---|
| 620a | Big Sales | Big Sales | Big Sales | | Y |
| 620b | $1500 | $1000 | $2000 | Y | |
| 620c | Needs Analysis | Prospecting | Prospecting | | Y |
| 620d | 8/24/2017 | 8/24/2017 | 9/12/2017 | | Y |
| 620e | 20% | 10% | 20% | | Y |
| 620f | Call prospect | Call prospect | Schedule a meeting | | Y |

| | Field Name | DraftRecord | Conflict |
|---|---|---|---|
| 620a | Opportunity Name | Big Sales | |
| 620b | Amount | $1500 | Y |
| 620c | Stage | Need Analysis | |
| 620d | Close Date | 9/12/2017 | |
| 620e | Probability | 20% | |
| 620f | Next Step | Schedule a meeting | |

PROCESSING OFFLINE UPDATES TO RECORDS OF A DATABASE SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to database systems and updates to records in a database system. More specifically, this patent document discloses techniques for processing offline updates to records of a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIGS. 6A-B show examples of determining conflicts between updates to records, in accordance with some implementations.

DETAILED DESCRIPTION

Figure 1:
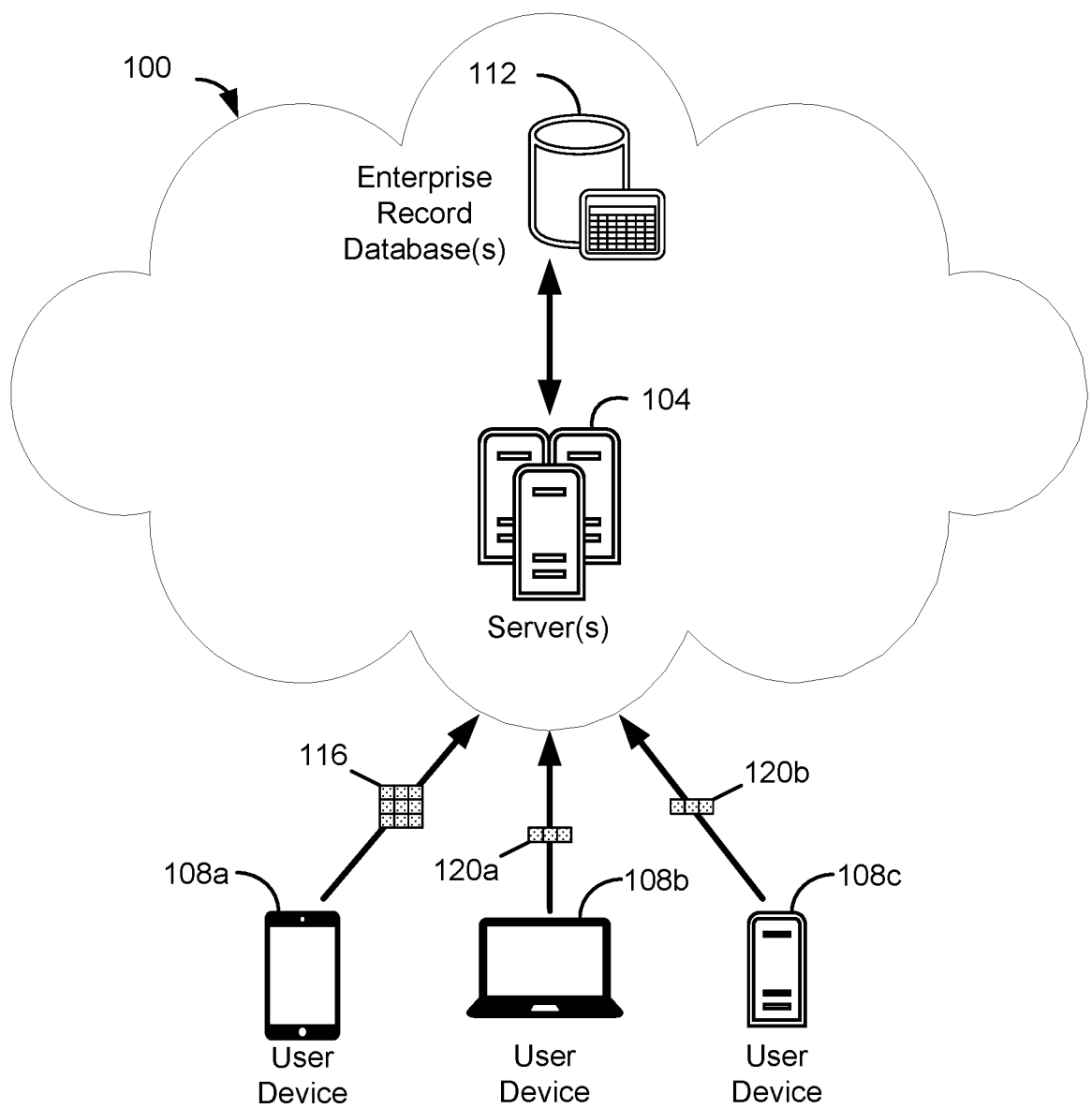
FIG. 1 shows a system diagram of an example of a system 100 for processing offline updates to records of a database system, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some of the disclosed implementations of systems, apparatus, methods and computer program products are configured for processing offline updates to records of a database system.

By way of example, Fastboat is a boat manufacturing company with offices in Manhattan. Alex, a salesperson at Fastboat, commutes from his Brooklyn home to the Fastboat offices using the subway. To get from Brooklyn to Manhattan, the subway train travels under the East River through a tunnel for a few minutes, which temporarily interrupts mobile internet connections. Typically, Alex uses his commute to follow up with potential sales leads on his smartphone. In one morning commute, Alex receives an email from Doug Fishcatcher asking Alex to call Doug that morning because Doug wants to purchase 12 new boats to add to Doug's fleet of fishing boats. Alex uses his smartphone to select a smartphone application providing access through a conventional enterprise computing environment to a customer relationship management (CRM) database storing CRM records for Fastboat. Alex would like to modify a sales opportunity record associated with Doug Fishcatcher, and Alex would like to add to the opportunity record a reminder note to call Doug. However, as Alex is entering changes to the sales opportunity record, the subway train enters the tunnel between Manhattan and Brooklyn. Thinking the changes will be successfully saved to the CRM database, Alex taps "Save" in the smartphone application while traveling through the tunnel. Unfortunately, Alex's smartphone is not connected to the internet when he taps Save, so the changes are lost. Alex later arrives at his office intending to call Doug right away, but upon his arrival, Alex is called into a meeting concerning a serious problem with another customer. The meeting takes over an hour, and Alex forgets about his call with Doug. Later, when Alex accesses a desktop application providing access to the CRM database, there is no indication of the changes that Alex attempted to make while on the train. Consequently, Alex does not remember to call Doug, and Fastboat loses a large sale.

In an alternative scenario, Fastboat uses an enterprise computing environment, which implements at least some of the disclosed techniques for processing offline updates to records of a database system. Returning to Alex's travel through the tunnel with no internet connection, when Alex uses his smartphone to enter an intended update to the opportunity record, an offline version of the update is created and stored locally on the smartphone. When the internet connection to the smartphone is restored, the offline version of the update is sent to a server of the enterprise computing environment for processing and updating of the sales opportunity record. Consequently, Alex's updates are accessible when he later logs in at his desktop computer. This can result in Alex remembering to call Doug and potentially closing the sale of 12 boats.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

In some but not all implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for processing offline updates to records of a database system, in accordance with some implementations. System 100 includes a variety of different hardware and/or software components which are in communication with each other. In the non-limiting example of FIG. 1, system 100 includes at least one server 104 and at least one enterprise record database 112.

Server 104 may communicate with other components of system 100. This communication may be facilitated through a combination of networks and interfaces. Server 104 may receive and process data requests from a user device 108a, user device 108b, and/or 108c. For example, user device 108b sends update 120a, e.g., "create opportunity Beta for account Alpha," that is received by server 104. Server 104 may then process update 120a, which creates a new opportunity record that is stored in enterprise record database 112. Similarly, server 104 may respond to requests from user device 108a, user device 108b, and/or user device 108c. In some implementations, server 104 responds to a request from user device 108a for record data of a user's recently accessed records, e.g., the 30 most recently accessed records. As part of receiving and processing requests, server 104 tracks and maintains metadata regarding updates received, e.g., update identifier, timestamp, identifier of a user device, etc. In other implementations, server 104 may retrieve data from one or more databases in system 100, combine some or all of the data from those databases, and send that combined data to user devices 108a, 108b, and/or 108c.

Enterprise record database 112 can be configured to receive, transmit, store, update, and otherwise maintain data of the enterprise records stored in enterprise record database 112. In some implementations, enterprise record database 112 can store customer relationship management (CRM) records. Examples of CRM records include instances of accounts, opportunities, leads, cases, contacts, contracts, campaigns, solutions, quotes, purchase orders, etc. In some implementations, transaction logs of CRM records and offline updates can be maintained in enterprise record database 112. A transaction log can include a variety of information concerning offline update transactions, for instance, unique offline identifiers, database record identifiers, user identifiers, transaction identifiers, master record versions, draft record versions, actions, e.g., edit, delete, new note, and error states. A master record generally refers to the last synchronized version of a particular record between the client and the server that can be used as a template for a draft record, and a draft record generally refers to a copy of a master record that includes any modifications made by a user. In some implementations, records of enterprise record database 112 are sent to user devices 108a, user device 108b, and/or user device 108c and stored in a user device cache.

User devices 108a-108c may be computing devices capable of communicating via one or more data networks with a server. Examples of user devices 108a-108c include a desktop computer or portable electronic device such as a smartphone, a tablet, a laptop, a wearable device, a smart watch, etc. User devices 108a-108c may send different types of updates to server 104, for instance, offline update 116 and online updates 120a and 120b. In some implementations, groups of updates are sent from user systems 108a-108c to server 104. In some implementations, groups of updates can include changes to many different records that are combined as a single request sent to server 104.

Figure 2:
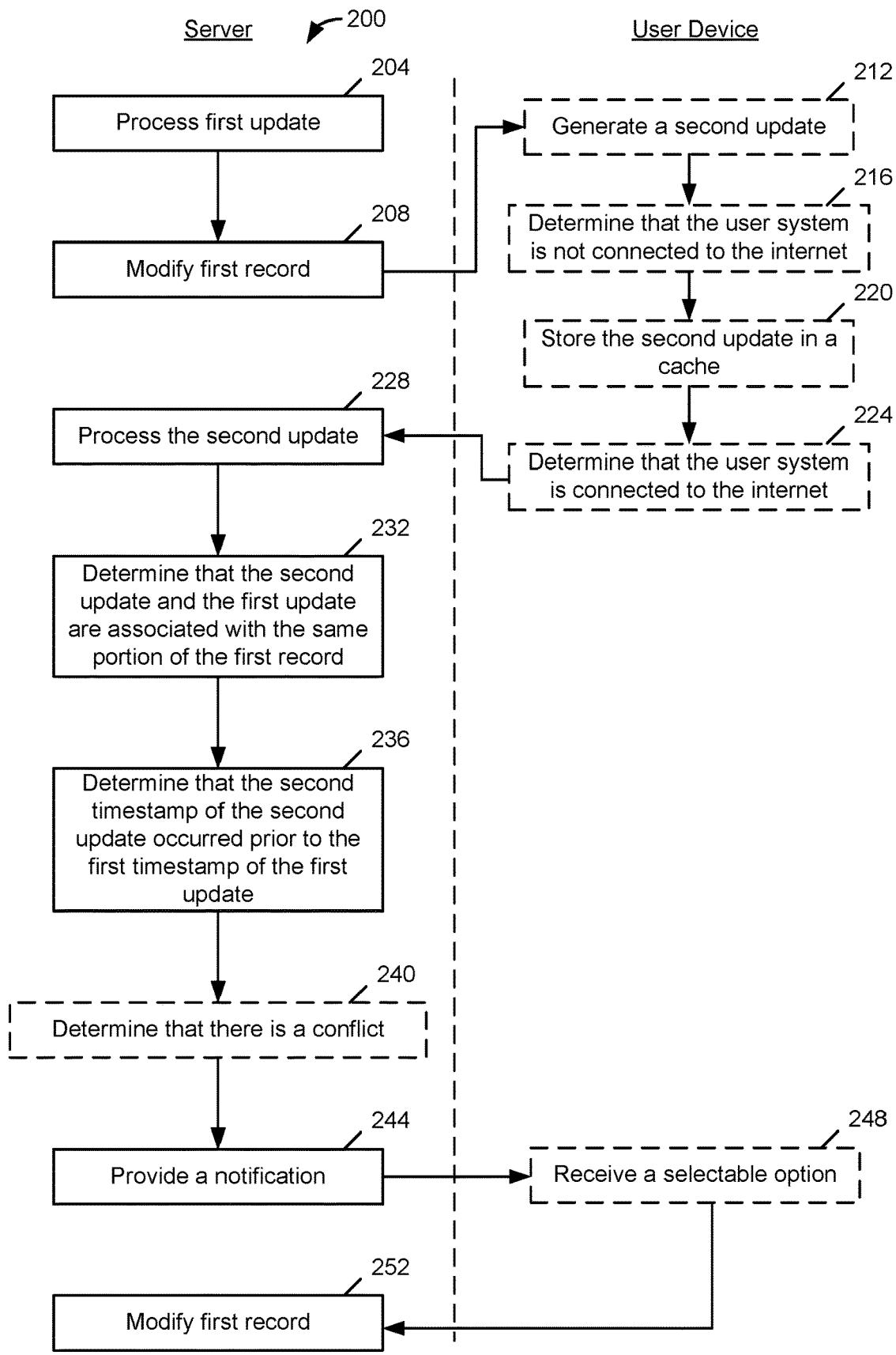
FIG. 2 shows a flow chart of an example of a method 200 for processing offline updates to records of a database system, in accordance with some implementations.

FIG. 2 shows a flow chart of an example of a method 200 for processing offline updates to records of a database system, in accordance with some implementations. Method 200 and other methods described herein may be implemented using system 100 of FIG. 1, although the implementations of such methods are not limited to system 100.

Figure 3:
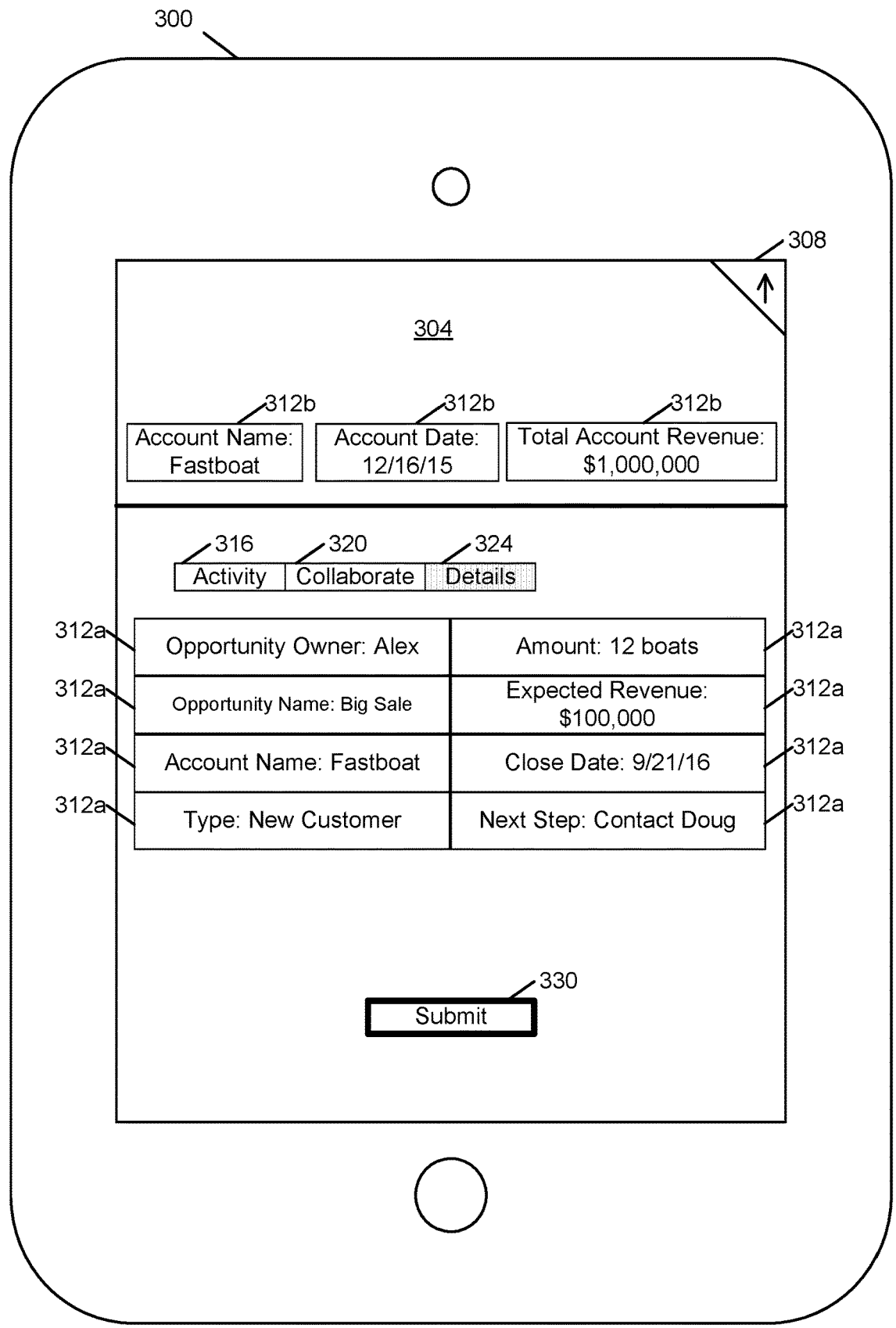
FIG. 3 shows an example of a device 300 displaying a graphical user interface (GUI) 304 including a presentation of a record, in accordance with some implementations.

In block 204 of FIG. 2, an update such as online update 120a of FIG. 1 is processed by server 104. In some implementations, online update 120a can be an update associated with a record stored in enterprise record database 112, e.g., changing a value of an opportunity record. In other implementations, update 120a can also be an offline update generated while user device 108b might be connected to the internet. For example, server 104 can "prime" a cache of user device 108b such that the cache includes the most recently visited records by a user of user device 108b. A primed cache may include but is not limited synchronized master records versions of recently visited records along with corresponding record metadata. As such, creating a new record and/or editing an existing record can generate a draft version based on the master version at user device 108b prior to being sent to server 104. FIG. 3 shows an example of a device 300 displaying a graphical user interface (GUI) 304 including a presentation of a record, in accordance with some implementations. In the example of FIG. 3, user interface 304 includes information associated with records, for instance, an opportunity record named "Big Sale" and an account record named "Fastboat." A user may interact with the "Big Sale" opportunity record by selecting between different tabs 316-324. One example of a tab is activity tab 316 for viewing feed items related to historical changes made to the opportunity record. Another example of a tab is collaborate tab 320 that is used for viewing posts and comments from other users who are working on the opportunity record.

In the example of FIG. 3, a user has selected details tab 324, which displays detailed information about the "Big Sale" opportunity record and the "Fastboat" account record. Data fields 312a and 312b are defined by the type of the record, e.g., data fields particular to a record type for a specific purpose. For example, data fields 312b can correspond to an account record type. As such, data fields 312b include "Account Name," "Account Date," and "Total Account Revenue." On the other hand, data fields 312a can correspond to an opportunity record type. As such, data fields 312a include "Opportunity Owner," "Opportunity Name," "Amount," etc. In some implementations, one record may depend from another record such that a parent-child relationship exists between the records. For example, an opportunity record, e.g., "Big Sale" may be a child record of an account record, e.g., "Fastboat." In some implementations, device 300 may generate an update when a data field is changed. For example, device 300 generates an update when "Close Date" of data field 312a is changed from "9/21/16" to "9/22/16," and a user selects button 330 to submit the change made. In other implementations, the update is generated automatically in near real-time as changes are being made to data fields 312a and 312b. Examples of data fields are not limited to the above-mentioned examples. Some other examples of data fields include an account identifier, an opportunity identifier, a record type, a feed comment, a feed post, a parent record identifier, a closing date, an owner identifier, a next task, a name, an address, a phone number, a purchase order, a sale price, a date, an account number, a geographic location, a website, customized data fields, etc.

Figure 4B:
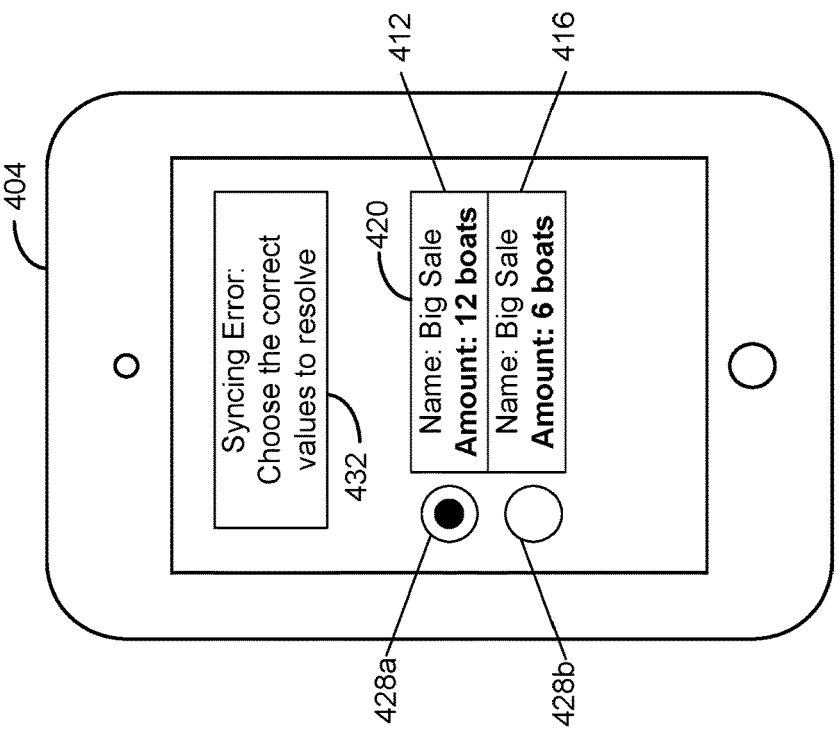
FIGS. 4A-B show examples of processing offline updates to records of a database system, in accordance with some implementations.
Figure 4A:
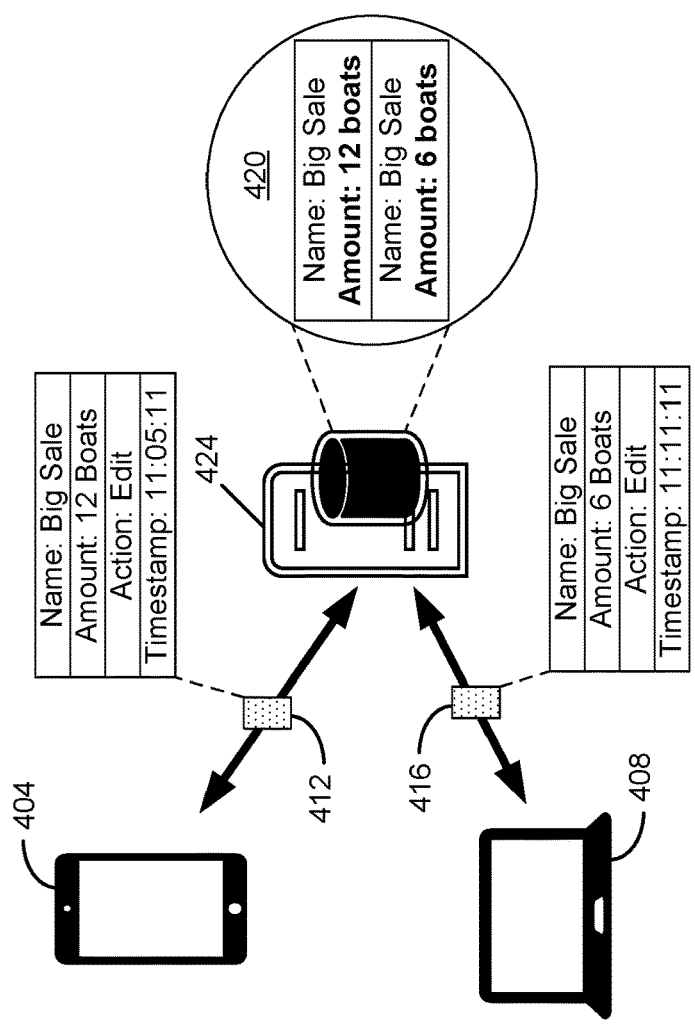

After online update 120a of FIG. 1 is generated, update 120a is sent to server 104. Also or alternatively, many different updates may be sent to server 104 as part of block 204 of FIG. 2. For example, user device 108b of FIG. 1 may send online update 120a to server 104, and user device 108c may send online update 120b. In this example, server 104 processes the online updates in the order they are received. As discussed further below, server 104 may determine whether an update was generated while a user device was online or offline. In some implementations, updates 120a and 120b include data, for instance, a value of "12 Boats", an action, for instance, "Edit", and a timestamp, for instance, "11:05:11." For example, FIGS. 4A-B show examples of processing offline updates to records of a database system, in accordance with some implementations. In FIG. 4A, user device 408 sends update 416 to server 424. In this example, update 416 includes data for an opportunity name, e.g., "Big Sale," and data for an opportunity amount, e.g., "6 Boats." In addition, update 416 includes an action, e.g., "Edit," for changing a value associated with the record. Also, update 416 includes a timestamp, e.g., "11:11:11," that is generated as part of update 416 when update 416 was created at user device 408. Actions are not limited to the above-mentioned examples. Other examples of actions include a new note action, a log a call action, a search action, a subscribe action, a post feed item action, a send e-mail action, a convert action, an escalate action, a publish action, a get action, a create action, a share action, a post action, an edit action, an archive action, a delete action, an update action, a comment action, and a like action.

In block 208 of FIG. 2, the opportunity record, e.g., "Big Sale," is modified according to the an action executed by server 104 of FIG. 1 with data from the processed update in block 204 of FIG. 2. Returning to the example of FIG. 4A, server 424 executes an action to edit the "Big Sale" opportunity record. In this example, the amount field could be updated from "5 Boats" to "6 Boats." In another example, a record is modified by many actions with different data, for instance, an amount field could be changed from "5 Boats" to "6 Boats," and an expected revenue field could be changed from "$100,000" to "$120,000." In one more example, the amount field of the "Big Sales" record is changed from "$100,000" to "$120,000" by a user while user device 404 is not connected to the internet. After some time passes, e.g., 1 minute, while user device 404 is still not connected to the internet, the user of user device 404 changes opportunity stage of the "Big Sales" record from "Prospecting" to "Need Analysis." As such, multiple modifications of the same record can be included as part of block 208 of FIG. 2. Also or alternatively, metadata defining the appearance of a field can be modified, for instance, the unit of measurement from the expected revenue field could be changed from "$100,000" to "$100,000.00." In addition, when one record is modified, e.g., changing the amount field to "6 Boats," another record may automatically be modified in response to the modification to the first record. For example, modifying an amount field of the "Big Sale" opportunity record may cause a related feed record, e.g. the feed record associated with activity tab 316 of FIG. 3, to be modified.

In block 212 of FIG. 2, another update, e.g., offline update 116 of FIG. 1, is generated at user device 108a. In some implementations, offline update 116 includes one update to, e.g., change the value of a field associated with a task record. Also or alternatively, offline update 116 can include many updates to different records, for instance, offline update 116 can include one update to create a new lead record and another update to change the value of a field associated with an opportunity record.

In block 216 of FIG. 2, it is determined that user device 108a of FIG. 1 is not connected to the internet. In some implementations, the determination of block 216 of FIG. 2 occurs before block 212. Also or alternatively user device 300 of FIG. 3 can display a message in user interface 304 when it is determined that user device 300 does not have an internet connection. An internet connection can also be interrupted for a variety of reason, for instance, a user manually turns off the mobile network connection of a device, physical interference disrupting the connection, etc.

In block 220 of FIG. 2, the update from block 212 is stored in a cache of user device 108a of FIG. 1. The cache of user device 108*a* can be used to temporarily store the update to the record until a new internet connection is established for user device 108*a*. In some implementations, user device 300 of FIG. 3 stores recently accessed records from a prevision session in the cache. A session includes all user interactions on user device 300 when the user is logged into a mobile application associated with an enterprise system. For example, during a user's previous session, the user viewed an opportunity record, an account record, and a task record, the cache of user device 300 would include cached versions of each of those records. In some implementations, server 104 of FIG. 1 can determine which records are accessed the most by a user, which can allow server 104 to refresh the cache of user device 108*a* with the most up to date versions of records. Also or alternatively, server 104 can automatically refresh the cache of user device 108*a* after a particular duration, e.g., one hour.

Figure 5A:
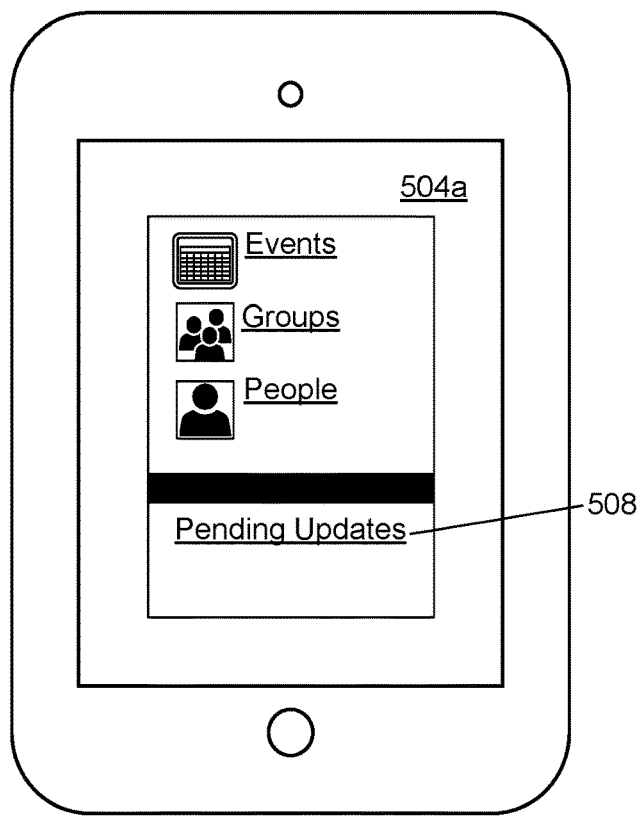
FIGS. 5A-B show examples of presentations of pending updates in the form of GUIs 504a and 504b as displayed on a computing device, in accordance with some implementations.
Figure 5B:
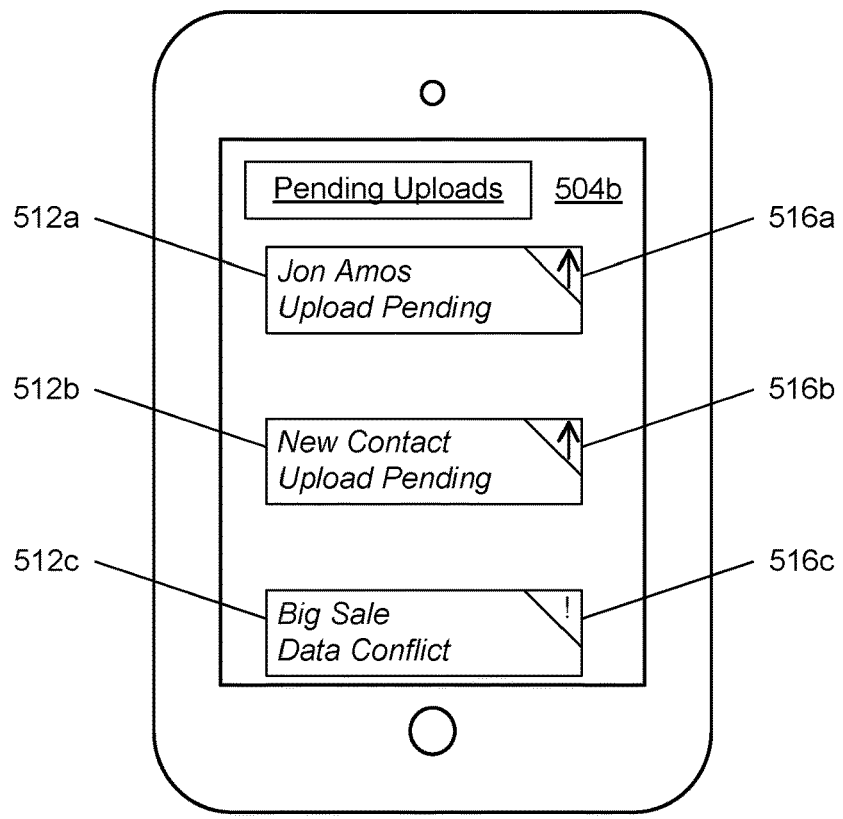

In some implementations, a user may also keep track of any updates stored in a cache of a user device. For example, when viewing a particular record with pending updates, status indicator 308 of FIG. 3 can be displayed. As another example, FIGS. 5A-B show examples of presentations of pending updates in the form of GUIs 504*a* and 504*b* as displayed on a computing device, in accordance with some implementations. In FIG. 5A, a list of links is displayed as part of user interface 504*a*. To view a list of pending updates, a user can select hyperlink 508 to view a list of pending updates. In response to a user selecting hyperlink 508, user interface 504*b* of FIG. 5B can be displayed. User interface 504*b* includes pending updates 512*a*-512*c*. There may be one pending update displayed for each update generated in block 212 of FIG. 2. In other implementations, multiple updates to the same record can be aggregated and displayed as one pending update to that particular record. Pending update 512*a* of FIG. 5B includes the name of the associated record, e.g., "Jon Amos" and a textual representation of its status, e.g., "Upload Pending." In FIG. 5B, pending updates 512-512*c* include corresponding status indicators 516*a*-516*c*, which visually identify the status of a respective pending update. Status indicators can display a variety of different colors and/or symbols to represent a status of a pending update. For example, status indicator 516*a* is an upward facing arrow indicating that pending update 512*a* was made while a mobile device was offline. Status indicator 516*a* can also indicate that a change to the "Jon Amos" record will be made when the device establishes a new internet connection. As another example, status indicator 516*c* is an exclamation point indicating that a data conflict was identified when the offline update was processed, and this conflict requires a user's attention to be resolved. Also or alternatively, pending updates 512*a*-512*c* that are sent to a server and successfully processed will be removed from the list of pending updates.

In block 224 of FIG. 2, it is determined that user device 108*a* of FIG. 1 is connected to the internet. In some implementations, a message can be displayed in user interface 304 of FIG. 3, indicating that a new connection between device 300 and the internet was established. In another implementation, the determination in block 224 of FIG. 2 can include determining that an internet connection exceeds a reliability threshold. For example, user device 108*a* of FIG. 1 can determine that a reliability threshold was exceeded after an internet connection has been established for a designated amount of time, e.g., 3-5 seconds. In another example, user device 108*a* can determine that a reliability threshold was exceeded after identifying an indication that another application running on user device 108*a* has sent and received data from a server. As such, user device 108*a* may use a reliability threshold to mitigate consequences of prematurely sending an update to server 104. For example, user device 108*a* may be receiving varying degrees of physical interference, e.g., traveling through a tunnel, which causes the mobile network connection to intermittently connect and disconnect to the internet. If user device 108*a* sends update 116 to server 104 during a brief moment of connectivity and loses the connection after sending update 116, server 104 can process update 116 and will attempt to return a response to user device 108*a*. However, because user device 108*a* is not connected to the internet, it never receives the response. As discussed further below, this can lead to user device 108*a* sending duplicate updates.

In block 228 of FIG. 2, offline update 116 of FIG. 1 is processed by server 104. In some implementations, server 104 determines that user device 108*a* was offline when the second update was generated. In other implementations, the processing of block 228 of FIG. 2 is similar in some aspects to the processing of block 204. Similar to update 416 of FIG. 4A, update 412 includes data, an action, and a timestamp. In this example, update 412 includes similar data as update 416 for opportunity name, e.g., "Big Sale." However, update 412 includes a timestamp, e.g., "11:05:11," that is different from the timestamp of update 416. Update 412 also includes an opportunity amount, e.g., "12 Boats," that is different from the opportunity amount of update 416. In some implementations, update identifiers associated with an update can be identified. For example, server 424 identifies update 412 as having an update identifier of "OppRecEdit24" and identifies update 416 as having an update identifier of "OppRecEdit16." Server 424 can use these update identifiers to determine whether one update identifier is different from another update identifier, which facilitates identification of duplicate updates and resolution of conflicts, as discussed further below.

Returning to the example discussed above, user device 108*a* of FIG. 1 sends update 116 to server 104, but never receives the response because user device 108*a* does not have an internet connection. Despite already being used to modify a record by server 104, user device 108*a* may send the same update 116 to server 104. If server 104 attempts to modify the record again with the same update 116, the two duplicate updates to the record can create a data conflict, e.g., two records representing a new task for "Following up with Doug." Data conflicts can render a record inoperable and may require a system administrator to manually correct the conflict. To address this issue, in some implementations, server 424 of FIG. 4A identifies the duplicate update and prevents the duplicate update from being used to modify a record. For each update received from a user device, server 424 generates an update identifier. Update identifiers can be added to a list of previously received updates maintained by server 424. The update identifier can be based on identifiable characteristics associated with the update, e.g., user device IP address, data, action, timestamp, etc. By way of example, server 424 executes a hash function on each update received, which generates a unique update identifier for the update. As such, update 412 could have an update identifier of "1234," and update 416 could have an update identifier of "1001." Later reference to the update identifier by server 424 can increase computational efficiency and can allow faster comparison between updates. If user device 412 sends a second update 412, server 424 compares the update identifier of the second update 412 to the list of previously received updates. Server 424 can identify the update identifier of the second update 412 as identical to the update identifier of the first update 412, which can cause server 424 to identify the second update 412 as a duplicate update. As such, the duplicate update can be deleted and/or removed from possible processing. In some implementations, server 424 may use a dependency tree data structure to identify dependencies between different records to be processed, e.g., a parent-child relationship between an account record and an opportunity record. Server 424 can identify types associated with two or more records that have pending updates to be processed. In order to avoid creating a data conflict, server 424 may assign the updates an order such that the records are modified according to sequence from the dependency tree that avoids creating a data conflict. In one example, a sequence would be a parent record being processed before a child record, e.g., account record before associated opportunity record.

In block 232 of FIG. 2, server 104 of FIG. 1 determines that updates 116 and 120a are associated with a similar portion of an opportunity record, e.g., a change to an opportunity amount for the "Big Sale." In some implementations, the determination in block 232 of FIG. 2 is done in response to processing the update in block 228. In the example of FIG. 4A, server 424 may do a field-by-field check, comparing the respective fields from update 412 and 416. For example, server 424 can compare the opportunity name of update 412, e.g., "Big Sale" to the opportunity name of update 416, e.g., "Big Sale." In addition, server 424 can compare the opportunity amount of update 412, e.g., "12 Boats" to the opportunity amount of update 416, e.g., "6 Boats."

In block 236 of FIG. 2, server 104 of FIG. 1 determines that the timestamp of update 116 occurred prior to the timestamp of update 120a. Similar to block 232 of FIG. 2, in some implementations, the determination in block 236 is done in response to processing the update in block 228. Similar to block 232, server 424 of FIG. 4A can compare the timestamp of update 412, e.g., "11:05:11 of a master record version," and to a last modified timestamp of a server record version of "Big Sale." The last modified timestamp of the server record version can be based on the timestamp provided by update 416, e.g., "11:11:11." In this example, server 424 determines that the timestamp of update 412 occurred prior to update 416. In an alternative example, if the timestamp of update 412 was "11:11:11" and the timestamp of update 416 was "11:05:11," server 424 would determine that update 412 occurred after update 416.

In block 240 of FIG. 2, server 424 of FIG. 4A may determine that there is a conflict 420 between updates 412 and 416. In some implementations, the determination in block 240 of FIG. 2 can be made using a combination of block 232 and block 236. For example, server 424 of FIG. 4A can compare the opportunity name of update 412, e.g., "Big Sale" to the opportunity name of update 416, e.g., "Big Sale." Since those values are identical, server 424 would determine that there is no conflict between the opportunity name of updates 412 and 416. In contrast, when server 424 compare the opportunity amount of update 412, e.g., "12 Boats" to the opportunity amount of update 416, e.g., "6 Boats," server 424 would determine that there is a conflict between updates 412 and 416.

In some implementations, as discussed above, the determination in block 224 of FIG. 2 can include determining that an internet connection exceeds a reliability threshold. In response to this determination, a synchronization event can be executed by user device 404 of FIG. 4A causing pending offline updates to be sent to server 424. In addition, user device 404 may send offline transaction identifiers of previously processed offline updates. In some implementations, server 424 maintains an associated transaction log for each user device. Consequently, upon receiving offline transaction identifiers of previously processed offline updates, server 424 may delete corresponding entries in the transaction log that correspond to the offline transaction identifiers received by server 424. As discussed above, server 424 may determine whether an offline update received was a duplicate of an earlier transaction. If the offline update received was not a duplicate, server 424 may compare the last modified date of the master record version to the last modified date of the server record version. If the server record version was modified more recently than the master record version, server 424 may proceed with a conflict determination between updates.

For example, FIGS. 6A-B show examples of determining conflicts between updates to records, in accordance with some implementations. In FIG. 6A, draft record version 604a and master record version 608 are compared to server record version 612, e.g., a field-by-field comparison between versions. For instance, opportunity name 620a of master record version 608 is "Big Sales," and opportunity name 620a of server record version 612 is also "Big Sales." As such, status 616 indicates that there is not a conflict between the values of opportunity name 620a, and the values of versions 604a, 608, and 612. In the same example, amount 620b of master record version 608 is "$1000," and amount 620b of server record version 612 is "$2000." In contrast to the values of opportunity name 620a, there is a difference between amount 620b of master record version 608 and amount 620b of server record version 612. As such, a server could then compare the value of amount 620b of draft record version 604a, e.g., "$1,500." As discussed further below, when versions 604a, 608, and 612 each have different values for a particular field, this can identified by a server as a conflict to be resolved. A server can continue with the field-by-field comparison of the values after a first conflict has been determined or the comparison may cease, and a notification to resolve the conflict can be sent to a user device. Continuing with the example of FIG. 6A, the server may compare stage 620c of master record version 608, e.g., "Prospecting," and stage 620c of server record version 612, e.g., "Prospecting." Compared to the examples discussed previously, stage 620c of draft record version 604a includes a value of "Needs Analysis." Despite stage 620c of draft record version 604a having a different value from stage 620c of versions 608 and 612, status 616 of stage 620c indicates that there is no conflict. In this situation, there is not a conflict because no other user modified the value of stage 620c prior to the offline update being processed. Similarly, close date 620d of draft record version 604a has a value that is different from close date 620d of server record version 612, but status 616 of close date 620d indicates that there is no conflict. In this situation, an offline update from a first user did not include a change to the value of close date 620d, but another user made a change to close date 620d while the device of the first user was not connected to the internet. Next step 620f and its respective values are similar to the previously discussed example. As the server compares probability 620e of versions 604a, 608, and 612, no conflict exists because an offline update from a first user includes the same change, e.g. "20%," as a change made by another user while the device of the first user was not connected to the internet.

In some implementations, upon completing the comparison, a 3-way merge between versions 604a, 608, and 612 can result in the example seen in FIG. 6B, e.g., new draft record version 604b. The values of master record version 608 can be designated as the origin source to merge different values, e.g., modifications, from versions 604a and 612. New draft record version 604b can include values that are same from each version, e.g., "Big Sales" of opportunity name 620a. In addition, new draft record version 604b can include values that are different from master record version 608 and are different from one of versions 604a and 612, but not both, e.g., "Needs Analysis" of stage 620c and "Schedule a meeting" of next step 620f. Also, new draft record version 604b can include any values that may be different from master record version 608, but are the same in draft record version 604a and server record version 612, e.g., "20%" of probability 620e. In some implementations, for any conflicts that have been identified, e.g., "$1500" of amount 620b, the merge operation may cease, and a notification to resolve the conflict, discussed in block 224 of FIG. 2, can be sent to a user device. Once the conflict is resolved, the merge operation can continue. Also or alternatively, "Schedule a meeting" of next step 620f can be included as a conflict to be resolved because the user of the offline user device was unaware of the change. In this example, a user of that device can be prompted to confirm the modification made by another user device. After new draft record version 604b has been successfully created and/or updated, a server can send the results back to a user device, and the user device can track successfully synchronized offline identifiers, which are sent as part of the processing discussed further above.

In block 244 of FIG. 2, server 104 of FIG. 1 provides a notification to user device 108a concerning the conflict of block 240 of FIG. 2. In some implementations, the notification indicates that update 120a of FIG. 1 was processed prior to update 116. The notification can include selectable options corresponding to the respective data that has a conflict. In block 248 of FIG. 2, a user may select one of the selectable options at user device 108a of FIG. 1 that causes user device 108a to send the selected option to server 104. For example, a user may select pending update 512c of FIG. 5B from the list of pending updates in user interface 504b. Upon selecting pending update 512c, notification 432 of FIG. 4B can be displayed on user device 404. Notification 432 can include selectable options 428a and 428b with respective data from updates 412 and 416. In the example of FIG. 4B, a user has selected selectable option 428a, but a user could also select selectable option 428b if "6 Boats" was the accurate opportunity amount. In block 252 of FIG. 2, server 104 of FIG. 1 receives the selected option in block 248 of FIG. 2 and modifies a record, e.g., "Big Sale," according to an action executed by server 104 of FIG. 1 with data from the update processed in block 228 of FIG. 2. In some implementations, block 252 is similar to block 208, but the modified record in block 252 can include an indication that a data conflict was resolved by a selection from a user. In the example of FIG. 4B, a user selects option 428a, which notifies server 424 to use the action and data corresponding to update 412 to modify the "Big Sale" record.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 7A:
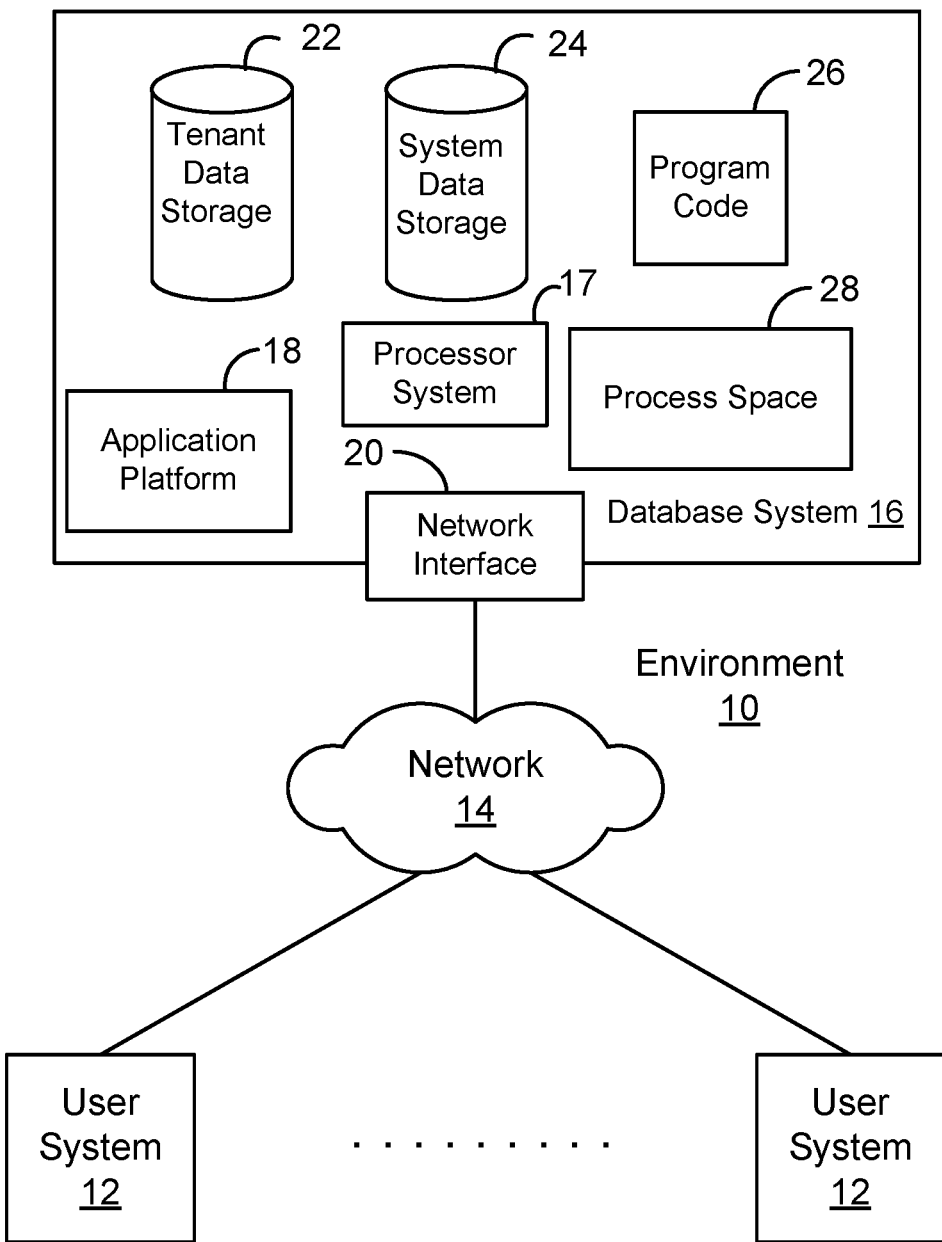
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7B:
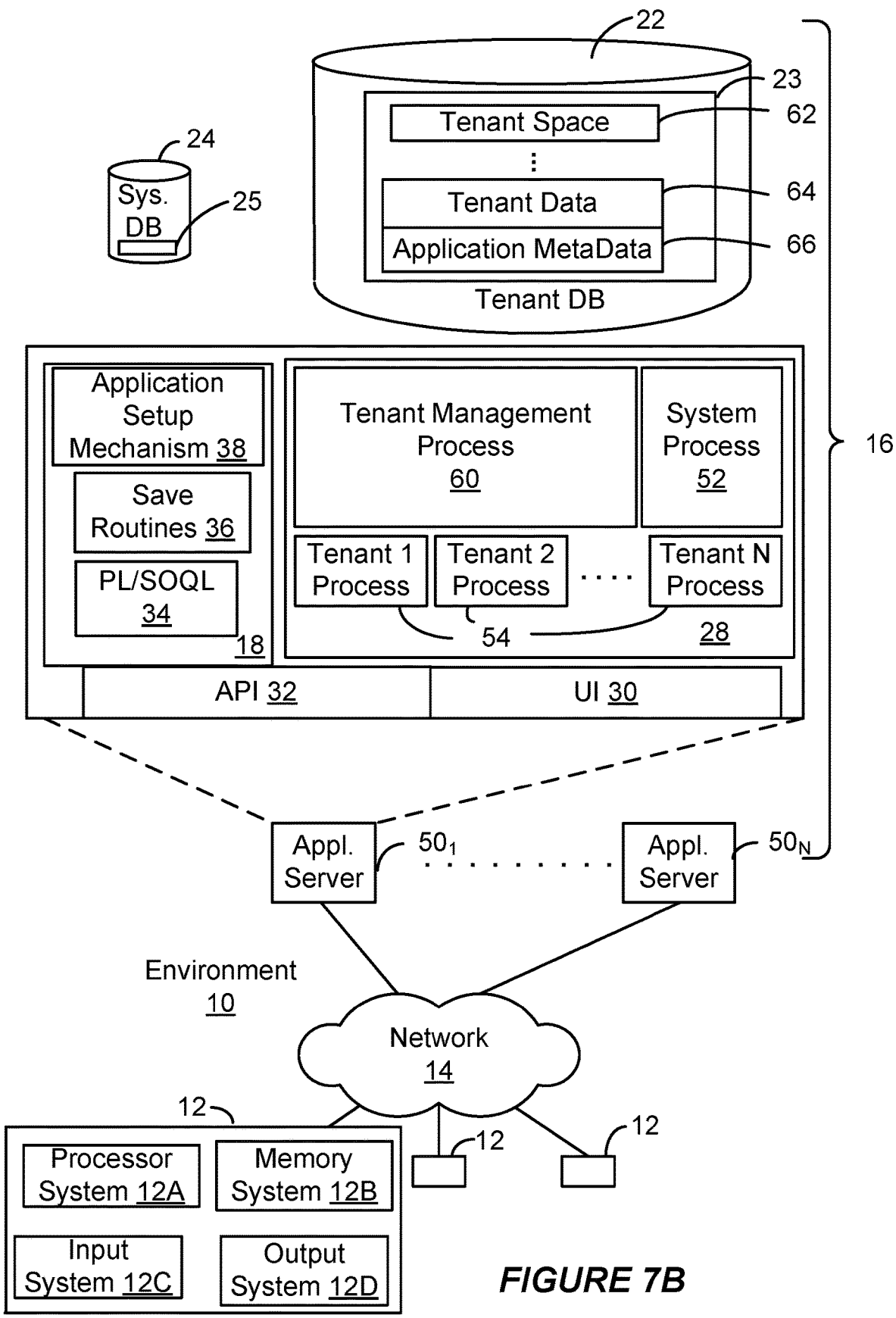
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 7B shows network 14 and system 16. FIG. 7B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
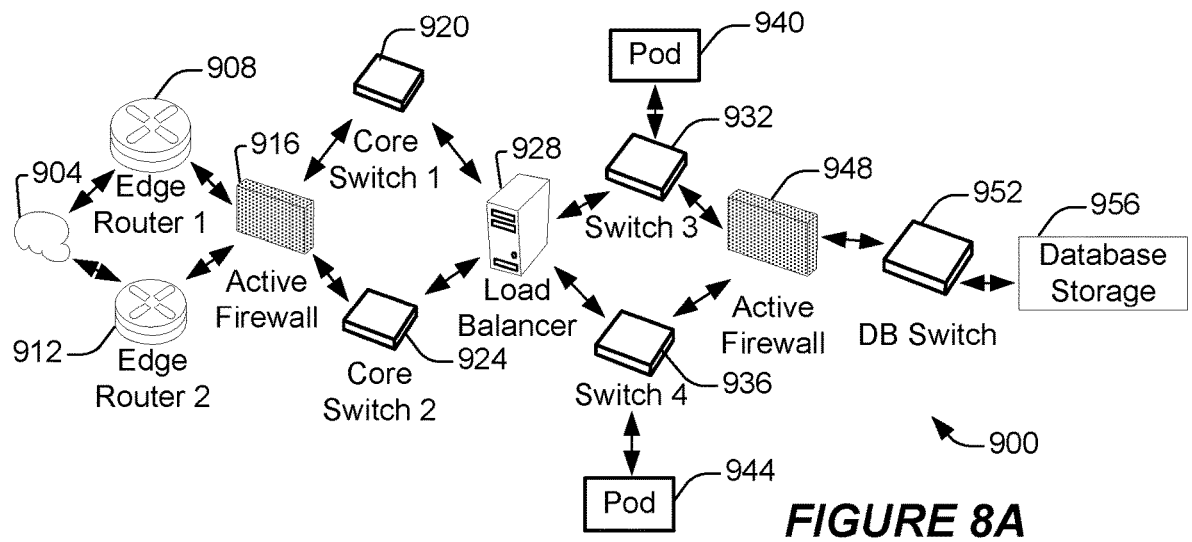
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 8B:
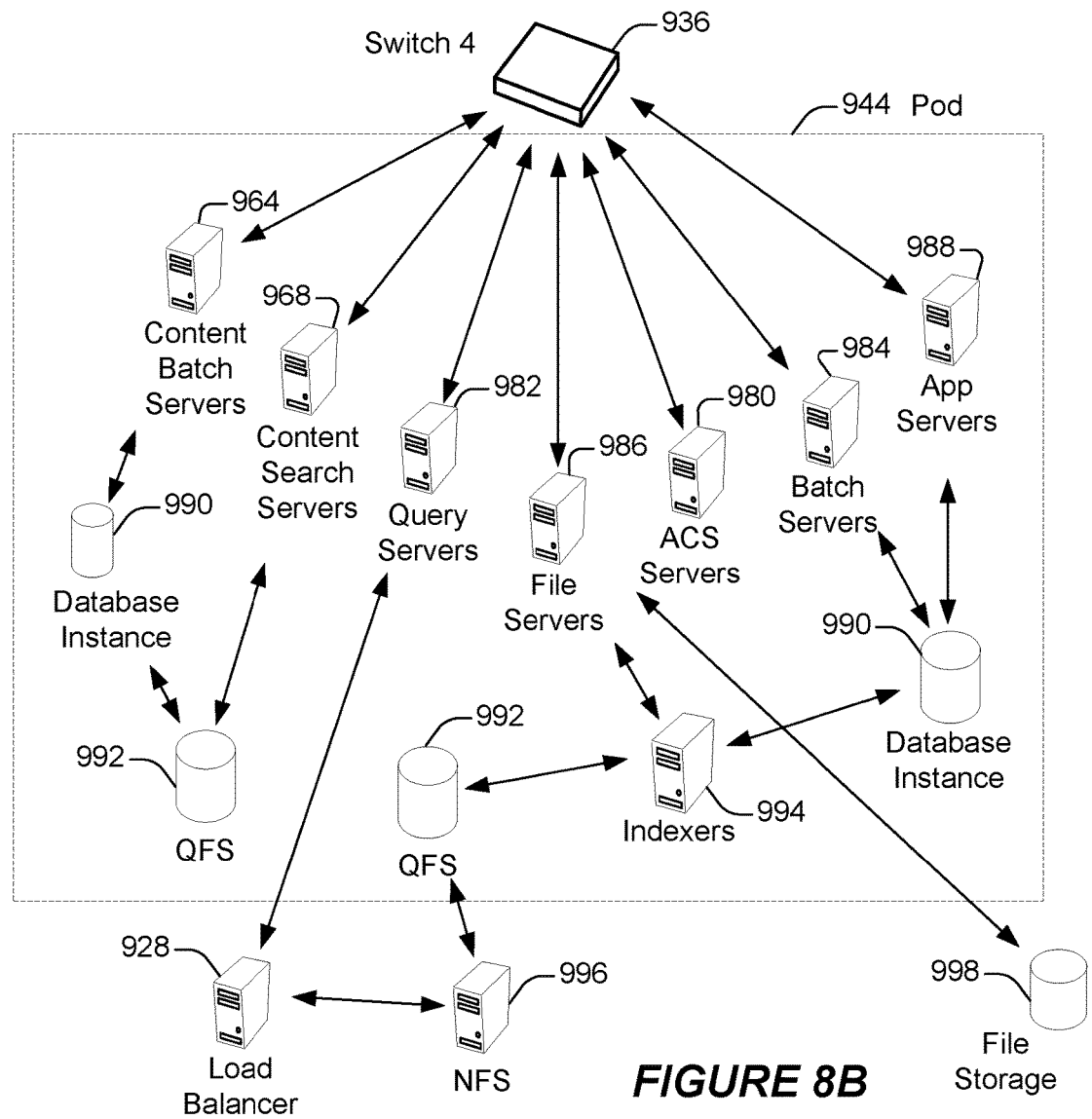
FIG. 8B shows a system diagram further illustrating an example of architectural components of an on-demand database service environment, in accordance with some implementations.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOB s). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a GUI on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
obtaining a first update to a first one of a plurality of records stored in a database, the first update received from a first device, the first update comprising first data, a first action, and a first timestamp;
modifying the first record according to the first action and the first data;
obtaining a second update to the first record and to a second record, the second update received from a second device different from the first device, the second update indicating that the second device had an offline status when the second update was generated, the second update comprising second data, a second action, and a second timestamp;
determining that the second update and the first update are associated with a same portion of the first record;
determining that the second timestamp is prior to the first timestamp;
determining that the first record is a first type of a plurality of types of customer records stored in the database, each type of customer record defining a corresponding arrangement of data fields storing customer data;
identifying, in the same portion of the first record, one or more data fields in the arrangement of data fields corresponding to the first type of customer record;
determining, using a dependency tree data structure configured to control a sequence of records to be processed, that the first type of customer record has a parent-child relationship in the database with a second type of customer record;
determining, based on the parent-child relationship, an order for modifying the first type of customer record and the second type of customer record;
modifying the first record before or after modifying the second record of the second type of customer record according to the determined order.

2. The system of claim 1, the database system further configurable to cause:
identifying a first update identifier associated with the first update;
identifying a second update identifier associated with the second update; and
determining that the second update identifier is different from the first update identifier.

3. The system of claim 2, the database system further configurable to cause:
obtaining a third update to the first record, the third update received from the second device;
identifying a third update identifier associated with the third update;
determining that the third update identifier is identical to the second update identifier; and
responsive to determining that the third update identifier is identical to the second update identifier, modifying the third update to indicate that the third update is a duplicate update.

4. The system of claim 1, wherein the second update is one of a plurality of updates received from the second device, the database system further configurable to cause:
obtaining a third update to a third record;
determining that the third record is a third type of customer record; and
based on a dependency relationship between the second type of customer record and the third type of customer record, processing the third update prior to processing the second update.

5. The system of claim 1, wherein the first action and the second action comprise one or more of: a search action, a subscribe action, a post feed item action, a send e-mail action, a convert action, an escalate action, a publish action, a get action, a create action, a share action, a post action, an edit action, an archive action, a delete action, an update action, a comment action, or a like action.

6. The system of claim 1, the database system further configurable to cause:
obtaining a third update to the first record, the third update received from a third device different from the first device and the second device, the third update indicating that the third device had an offline status when the third update was generated, the third update comprising third data, a third action, and a third timestamp;
determining that the third update, the second update, and the first update are associated with the same portion of the first record;
determining that the third timestamp is prior to the first timestamp and the second timestamp; and
providing a notification to the third device indicating that the first update and the second update were processed prior to the third update, the second notification configurable to cause display, in a user interface at the third device, of a selectable first option representing the first data, a selectable second option representing the second data, and a selectable third option representing the third data.

7. The system of claim 1, wherein the second update further comprises a status indicator associated with the second update, the status indicator capable of being displayed in a user interface of the second device.

8. A method comprising:
obtaining a first update to a first one of a plurality of records stored in a database, the first update received from a first device, the first update comprising first data, a first action, and a first timestamp;
modifying the first record according to the first action and the first data;
obtaining a second update to the first record and to a second record, the second update received from a second device different from the first device, the second update indicating that the second device had an offline status when the second update was generated, the second update comprising second data, a second action, and a second timestamp;
determining that the second update and the first update are associated with a same portion of the first record;
determining that the second timestamp is prior to the first timestamp;
determining that the first record is a first type of a plurality of types of customer records stored in the database, each type of customer record defining a corresponding arrangement of data fields storing customer data;
identifying, in the same portion of the first record, one or more data fields in the arrangement of data fields corresponding to the first type of customer record;
determining, using a dependency tree data structure configured to control a sequence of records to be processed, that the first type of customer record has a parent-child relationship in the database with a second type of customer record;

determining, based on the parent-child relationship, an order for modifying the first type of customer record and the second type of customer record; and modifying the first record before or after modifying the second record of the second type of customer record according to the determined order.

9. The method of claim 8, further comprising:
identifying a first update identifier associated with the first update;
identifying a second update identifier associated with the second update; and
determining that the second update identifier is different from the first update identifier.

10. The method of claim 9, the method further comprising:
obtaining a third update to the first record, the third update received from the second device;
identifying a third update identifier associated with the third update;
determining that the third update identifier is identical to the second update identifier; and
responsive to determining that the third update identifier is identical to the second update identifier, modifying the third update to indicate that the third update is a duplicate update.

11. The method of claim 8, wherein the second update is one of a plurality of updates received from the second device, the method further comprising:
obtaining a third update to a third record;
determining that the third record is a third type of customer record; and
based on a dependency relationship between the second type of customer record and the third type of customer record, processing the third update prior to processing the second update.

12. The method of claim 8, wherein the first action and the second action comprise one or more of: a search action, a subscribe action, a post feed item action, a send e-mail action, a convert action, an escalate action, a publish action, a get action, a create action, a share action, a post action, an edit action, an archive action, a delete action, an update action, a comment action, or a like action.

13. The method of claim 8, the method further comprising:
obtaining a third update to the first record, the third update received from a third device different from the first device and the second device, the third update indicating that the third device had an offline status when the third update was generated, the third update comprising third data, a third action, and a third timestamp;
determining that the third update, the second update, and the first update are associated with the same portion of the first record;
determining that the third timestamp is prior to the first timestamp and the second timestamp; and
providing a notification to the third device indicating that the first update and the second update were processed prior to the third update, the second notification configurable to cause display, in a user interface at the third device, of a selectable first option representing the first data, a selectable second option representing the second data, and a selectable third option representing the third data.

14. The method of claim 8, wherein the second update further comprises a status indicator associated with the second update, the status indicator capable of being displayed in a user interface of the second device.

15. A computer program product comprising computer-readable program code to be executed by one or more processors when retrieved from a non-transitory computer-readable medium, the program code comprising instructions configurable to cause:
obtaining a first update to a first one of a plurality of records stored in a database, the first update received from a first device, the first update comprising first data, a first action, and a first timestamp;
modifying the first record according to the first action and the first data;
obtaining a second update to the first record and to a second record, the second update received from a second device different from the first device, the second update indicating that the second device had an offline status when the second update was generated, the second update comprising second data, a second action, and a second timestamp;
determining that the second update and the first update are associated with a same portion of the first record;
determining that the second timestamp is prior to the first timestamp;
determining that the first record is a first type of a plurality of types of customer records stored in the database, each type of customer record defining a corresponding arrangement of data fields storing customer data;
identifying, in the same portion of the first record, one or more data fields in the arrangement of data fields corresponding to the first type of customer record;
determining, using a dependency tree data structure configured to control a sequence of records to be processed, that the first type of customer record has a parent-child relationship in the database with a second type of customer record;
determining, based on the parent-child relationship, an order for modifying the first type of customer record and the second type of customer record; and
modifying the first record before or after modifying the second record of the second type of customer record according to the determined order.

16. The computer program product of claim 15, the instructions further configurable to cause:
identifying a first update identifier associated with the first update;
identifying a second update identifier associated with the second update; and
determining that the second update identifier is different from the first update identifier.

17. The computer program product of claim 16, the instructions further configurable to cause:
obtaining a third update to the first record, the third update received from the second device;
identifying a third update identifier associated with the third update;
determining that the third update identifier is identical to the second update identifier; and
responsive to determining that the third update identifier is identical to the second update identifier, modifying the third update to indicate that the third update is a duplicate update.

18. The computer program product of claim 15, wherein the second update is one of a plurality of updates received from the second device, the instructions further configurable to cause:

obtaining a third update to a third record;

determining that the third record is a third type of customer record; and based on a dependency relationship between the second type of customer record and the third type of customer record, processing the third update prior to processing the second update.

19. The computer program product of claim 15, wherein the first action and the second action comprise one or more of: a search action, a subscribe action, a post feed item action, a send e-mail action, a convert action, an escalate action, a publish action, a get action, a create action, a share action, a post action, an edit action, an archive action, a delete action, an update action, a comment action, or a like action.

20. The computer program product of claim 15, the instructions further configurable to cause:

obtaining a third update to the first record, the third update received from a third device different from the first device and the second device, the third update indicating that the third device had an offline status when the third update was generated, the third update comprising third data, a third action, and a third timestamp;

determining that the third update, the second update, and the first update are associated with the same portion of the first record;

determining that the third timestamp is prior to the first timestamp and the second timestamp; and providing a notification to the third device indicating that the first update and the second update were processed prior to the third update, the second notification configurable to cause display, in a user interface at the third device, of a selectable first option representing the first data, a selectable second option representing the second data, and a selectable third option representing the third data.

\* \* \* \* \*